US006988239B2

(12) United States Patent
Womble et al.

(10) Patent No.: US 6,988,239 B2
(45) Date of Patent: Jan. 17, 2006

(54) METHODS AND APPARATUS FOR PREPARATION AND ADMINISTRATION OF TRAINING COURSES

(75) Inventors: Debra H. Womble, Raleigh, NC (US); Cheryl A. Milligan, Raleigh, NC (US); Judith N. Gallagher, Cary, NC (US)

(73) Assignee: GE Mortgage Holdings, LLC, Raleigh, NC (US)

( * ) Notice: Subject to any disclaimer, the term of this patent is extended or adjusted under 35 U.S.C. 154(b) by 662 days.

(21) Appl. No.: 09/683,375

(22) Filed: Dec. 19, 2001

(65) Prior Publication Data

US 2003/0115550 A1 Jun. 19, 2003

(51) Int. Cl.
*G06F 17/24* (2006.01)
*G09B 3/00* (2006.01)
(52) U.S. Cl. .................... 715/501.1; 715/513; 715/530; 715/531; 715/738; 434/350; 434/362; 434/323
(58) Field of Classification Search ...................... None
See application file for complete search history.

(56) References Cited

U.S. PATENT DOCUMENTS

| | | | | |
|---|---|---|---|---|
| 5,823,781 A | * | 10/1998 | Hitchcock et al. | 434/323 |
| 6,157,808 A | * | 12/2000 | Hollingsworth | 434/350 |
| 6,438,353 B1 | * | 8/2002 | Casey-Cholakis et al. | 434/350 |
| 6,505,031 B1 | * | 1/2003 | Slider et al. | 434/350 |
| 6,546,230 B1 | * | 4/2003 | Allison | 434/350 |
| 2002/0064766 A1 | * | 5/2002 | Cozens et al. | 434/350 |
| 2003/0009742 A1 | * | 1/2003 | Bass et al. | 717/104 |
| 2003/0046265 A1 | * | 3/2003 | Orton et al. | 707/1 |
| 2003/0207245 A1 | * | 11/2003 | Parker | 434/350 |

OTHER PUBLICATIONS

Kapp, Karl M., Speed Is King: Rapid Creation and Deployment of Enterprise E-Learning Solutions (Macromedia, Inc. © 2004).*
http://www.acroservices.com/newAS/files/products/acrotrain.htm, as it appeared on Nov. 5, 2004.*
http://www.traincaster.com/products_bui.shtml, as it appeared on Oct. 21, 2004.*
http://www.capterra.com/courseware-solutions, as it appeared on Apr. 4, 2004.*

* cited by examiner

*Primary Examiner*—Doug Hutton
(74) *Attorney, Agent, or Firm*—Priest & Goldstein, PLLC

(57) ABSTRACT

Techniques for creation and management of training courses are described. A system according to an aspect of the invention includes a central server accessible by one or more user computers. The central server hosts a training administration module which has access to a user database, a course library and a course creation module. The course creation module has access to a template database. The training administration module is able to retrieve information from the user database and the course library and to assign courses to students, to identify the status of students with respect to courses and of courses with respect to students, and to retrieve and display information relating to student progress in or completion of a course.

14 Claims, 17 Drawing Sheets

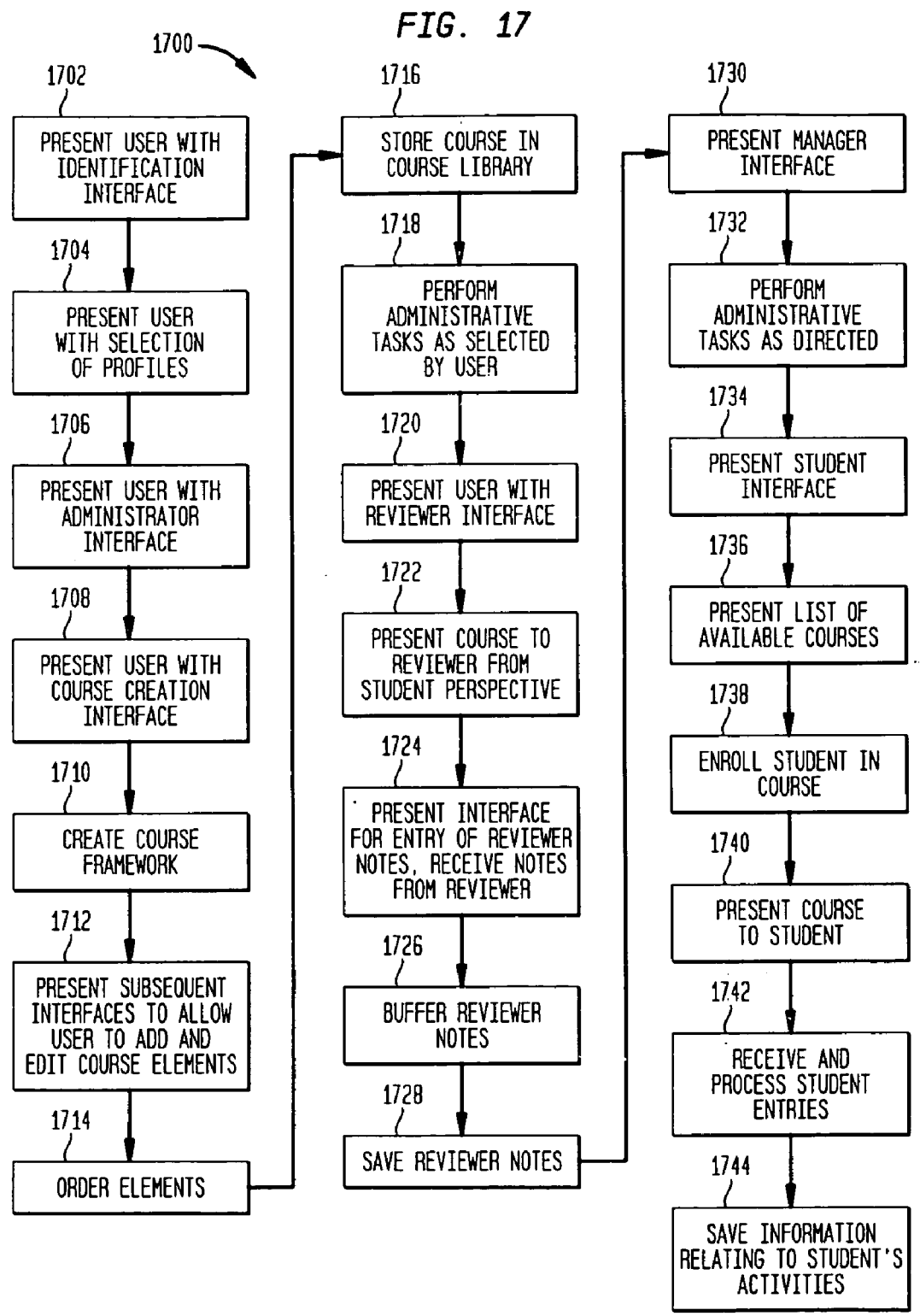

METHODS AND APPARATUS FOR PREPARATION AND ADMINISTRATION OF TRAINING COURSES

BACKGROUND OF INVENTION

The present invention relates generally to improved methods and apparatus for development and management of training courses. More particularly, the invention relates to advantageous techniques for creating, presenting and managing computer-based training courses.

Many companies and other organizations have a continuing need for cost-effective ways to train employees, which are easy to develop and convenient for the employees. This is particularly true in cases in which employees need to be trained in order to ensure that they conduct business in accordance with government regulations. Failure to comply with such regulations can prove costly to the business and can damage the reputation of the business. It is important that employees know what regulations are in force, how these regulations affect them and what steps to take to insure that they comply with these regulations.

Training helps to make employees aware of what they need to do, and ongoing or periodic and reasonably frequent training and evaluation of employee knowledge helps to keep the information fresh so that employees continue to maintain good practices. In order to provide ongoing or periodic training, it is highly beneficial to make the training inexpensive to the company and convenient for the employee. An employee can be expected to be more conscientious about undertaking required training if he or she can schedule the training and take advantage of it when desired. An employee's ability to schedule training also improves the employee's productivity, because an employee can schedule training at times when it will not interfere with other pressing work.

In order to make sure that employees comply with training requirements, it is important to be able to administer training so as to correctly identify employees requiring training in a particular area, to provide appropriate training to those employees at appropriate times, to remind employees when they should undertake training and to make sure that employees have completed training as expected and that they have successfully gained the knowledge expected from the training. It is important to assemble information relating to training and to make this information accessible to managers and other personnel who need to understand what training activities are going on and how well employees are achieving the results expected from training.

It is also beneficial if the course development process and tools used in course development are relatively easy to understand and use, so that anyone with a sound grasp of the course material can design a course without encountering undue obstacles presented by the course development process or the equipment used to develop a course. The absence of technical obstacles increases the number of persons who can develop courses and also tends to increase the quality of courses by relieving pressure that might otherwise exist for courses to be developed by persons proficient with the course development tools, whether or not such persons have the greatest knowledge of the course material.

It is also beneficial to provide a central repository for course information and student information as it relates to courses, so that course material can be easily retrieved, edited and modified, and comments from users and reviewers of the course material can be stored in a central location, with comments about a course associated with that course. Providing a central repository also allows easy monitoring of student compliance with course requirements and progress in completing courses, allowing a manager or other responsible person to be notified early in order to insure that a student completes courses as scheduled.

SUMMARY OF INVENTION

A system according to an aspect of the invention includes a central server accessible by one or more user computers. The central server hosts a training administration module which has access to a user database, a course library and a course creation module. The course creation module has access to a template database. The training administration module is able to retrieve information from the user database and the course library and to assign courses to students, to identify the status of students with respect to courses and of courses with respect to students, and to retrieve and display information relating to student progress in or completion of a course.

A method according to an alternative aspect of the present invention includes the steps of receiving identifying information from a user, upon validation of the identifying information, retrieving a user entry identifying the status of the user with respect to a set of training administration resources including a user database including user information for a plurality of users, a course library including a plurality of training courses and course building and administration tools, presenting the user with a selection of available profiles, each profile being associated with a user function and upon selection by the user of a desired profile, presenting the user with tools and resources appropriate to the profile and giving the user access to the user database and course library in order to carry out functions associated with the profile.

A more complete understanding of the invention, as well as further features and advantages of the invention, will be apparent from the following Detailed Description and from the claims which follow below.

BRIEF DESCRIPTION OF DRAWINGS

FIG. 17 illustrates a process of training course management according to an alternative aspect of the present invention.

DETAILED DESCRIPTION

Figure 1:
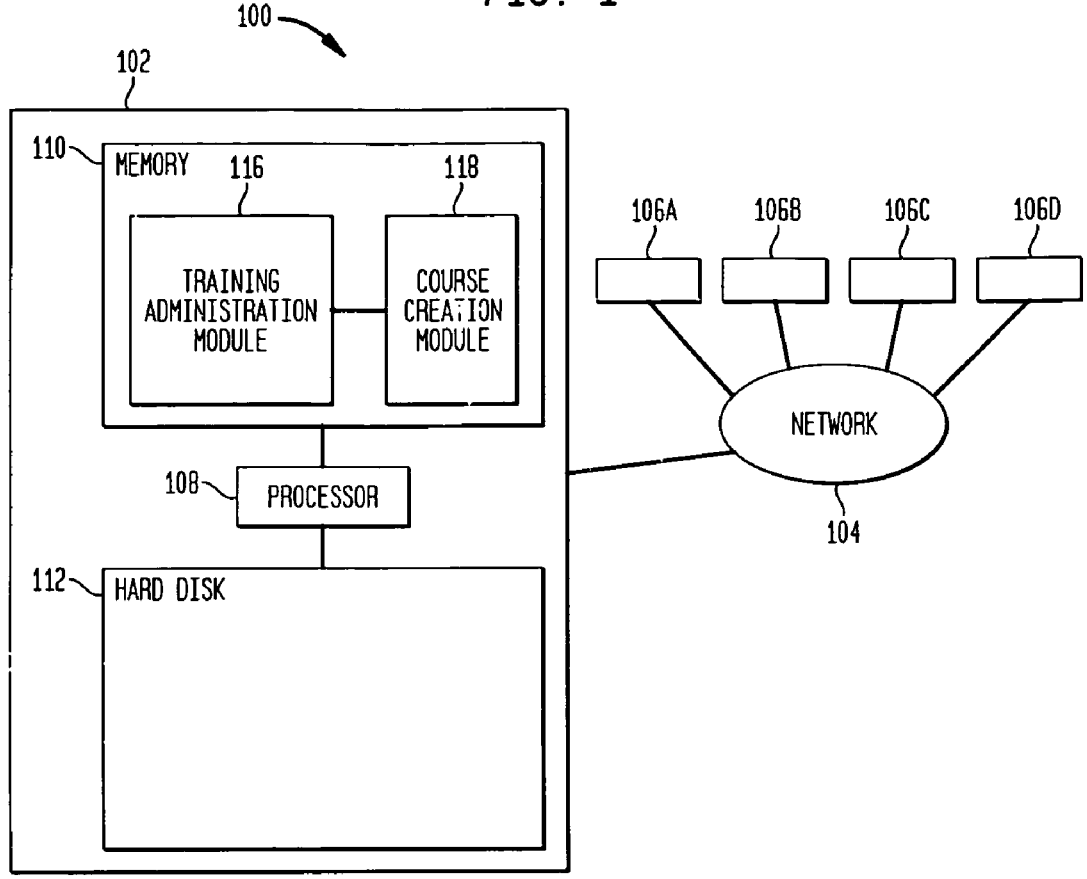
FIG. 1 illustrates a training management system according to an aspect of the present invention.

FIG. 1 illustrates a training management system 100 according to an aspect of the present invention. The system includes a central server 102 connected to a network 104. The network 104 may suitably be a local area network, a public network such as the Internet, or a series of networks. For example, the central server 102 may be connected to a local area network which is in turn connected to the Internet. The central server 102 is accessible to a plurality of user computers such as the computers 106A–106D through the network 104. The computer 106A may belong to a training system manager, the computer 106B may belong to an administrator having responsibility for creating and managing one or more courses, the computer 106C may belong to a reviewer having knowledge of material included in a course and therefore having responsibility for reviewing that course and the computer 106D may belong to a student employing the system 100 to take a course. The central server 102 may communicate with any number of user computers, but for purposes of simplicity only the user computers 106A-106D are illustrated here. The central server 102 may also communicate with other resources through the network 104 and these resources will be described as encountered in the description of the system 100.

The central server 102 preferably includes a processor 108, memory 110 and hard disk 112, and hosts a training administration module 116, preferably implemented as software. The training administration module 116 employs a course creation module 118. The training administration module 116 authenticates users, retrieves and displays user and course information, prepares reports for administrators and other responsible persons and invokes the course creation module 118 for the creation of course materials and its assembly into courses. The training administration module 116, and course creation module 118 are described in greater detail below.

Figure 2:
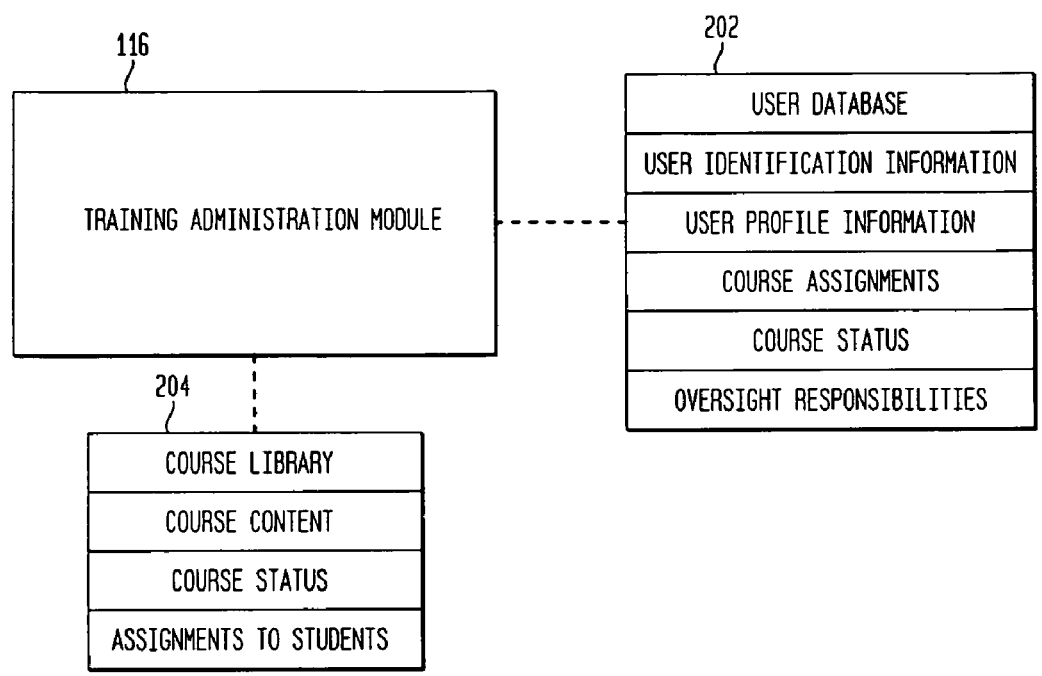
FIG. 2 illustrates additional details of a training administration module illustrated in FIG. 1.

FIG. 2 illustrates additional details of the training administration module 116 of FIG. 2. The training administration module 116 has access to a user database 202, which includes a user entry for each user. Each user entry preferably includes identifying and authentication information for the user; for example a username and password. The identifying information for each user is preferably associated with privilege information for the user. The different privilege levels implemented in the exemplary system 100 are (1) student privileges, allowing a user to select and complete a course, (2) reviewer privileges, allowing the user to review course content, (3) manager privileges, allowing the user review reports and information relating to the training activities of students for whom they have supervisory responsibility, (4) administrator privileges, allowing a user to create and enter courses, assign those courses to particular students or groups of students and review information relating to those courses and (5) training manager privileges, giving the user complete access to all elements of and information in the training system 100. Users having reviewer or administrator privileges may have these privileges only with respect to certain courses, so that particular administrators or reviewers have access only to those courses into which they may be expected to have input. Users having reviewer, manager, administrator or training manager privileges also have student privileges to all courses to which they have access, allowing them to take courses as students either for learning or to test the course content in a realistic way. In addition, users other than those with training manager privileges may have only student privileges to courses for which they do not have oversight responsibilities.

In addition to identifying information, each user entry may suitably include user profile information for one or more user profiles assigned to the user. Each user preferably has a student profile preferably including information which may be similar to that found in a personnel database and may suitably include the name of each user as well as other identification, such as network username, email address, telephone number and job description information, department in which the employee works, and organization to which the cost of the training is to be billed. The job description information preferably includes succinct descriptions, such as job function codes, which may be easily searched. The ability to search through users by job function code makes it easier to determine which students should be assigned a particular training course, or to assign training courses to groups of students on the basis of job function code, organizational grouping, such as department, or other similar criteria. The user database 202 may also include additional identification information specially designed for use with the system 100 and relating to skills which the student needs and identifying courses or groups of courses useful in developing those skills, and which the student may be required to take. The user database 202 may also include still further identification information relating to other courses which a student is eligible to take.

Each student profile also includes identification of all courses assigned to the student, along with the student's status with respect to each course, that is, whether the course is optional or required, whether the student has started the course, whether the student has completed the course, whether the student has successfully completed any examinations related to the course and dates relating to various milestones for each course, such as the date by which the student must begin or complete a required course and the date when a student actually began or completed a course.

In addition to having a student profile for each user, the user database 202 also includes additional profiles for users having higher privilege levels, indicating the areas in which the user has oversight responsibilities. These profiles will be discussed in further detail below.

Once a user has logged into the system 100, the training administration module 116 allows him or her to select the profile under which he or she wishes to operate, in order to see aspects of the system and perform functions available under that profile. For example, an user having training manager privileges may have a training manager profile, a manager profile, an administrator profile, a reviewer profile and a student profile. The training manager can therefore use the system 100 from the perspective of every different class of user, in order to evaluate different aspects of the system 100 and identify potential problems affecting a class of user.

An administrator profile for a user includes a list of all courses for which the administrator has oversight responsibility, a reviewer profile includes a list of all courses for which the reviewer has responsibility and a manager profile includes a list of all users whose participation in training is supervised by the manager. The manager profile may include information identifying the users, typically students, over whom a manager has responsibility. This information may come, for example, in the form of a list of individual users, a department or job function identification which can be matched against student profiles in order to identify users with a particular manager.

The training administration module also has access to a course library 204 for storing courses which have been created. The course library 204 includes course materials for each course, as well as a status indicator for each course. For example, a course may have a status of active or inactive. In such a case, a status of active would mean that a course is available for assignment and use, a status of of inactive would mean that a course is in the library 204 but is not available because it is being developed, because it is being reviewed or because it is unavailable for use by a student for some other reason. The training administration module 116 may suitably be designed such that a course having a status of inactive would be visible only to the administrator responsible for the course, with the exception that courses having any status would always be visible to the training manager or training managers. The user database 202 and the course library 204 are presented here as separate entities, but it will be recognized that the user information and course information may be stored and managed according to numerous techniques. For example, the user information and course information may be stored in a single database or divided across multiple databases.

The training administration module 116 presents a security interface when invoked by a user, allowing the user to enter his or her username and password. This interface may suitably be presented as a hypertext page displayed in a browser window. Upon entry of the username and password, the training administration module 116 presents an initial login interface reflecting one of the user's profiles. The initial login interface may include commands available to the user and information relating to the profile under which the user is operating. For example, if a user has selected the use of his or her administrator profile, the interface may suitably list all courses for which the user is responsible, with commands available for use with those courses. The interface also presents a mechanism for selecting a different profile, as well as mechanisms for executing additional commands.

If a user has selected the use of his or her reviewer profile, an interface is presented listing all courses for which the reviewer has responsibility, along with commands relating to those courses. The interface also presents a mechanism for selecting a different profile, as well as mechanisms for executing additional commands. The reviewer profile allows the reviewer to see the course in the same way that it is seen by a student, and to attach comments to the course. Multiple reviewers may have reviewer responsibility for a course, so that comments can be received from a number of different perspectives.

If a user has selected to use his or her student profile, or has only a student profile, an interface is presented listing all courses available to the user, along with information relating to each course. The interface also presents a mechanism for selecting a different profile, as well as mechanisms for executing additional commands.

Figure 3:
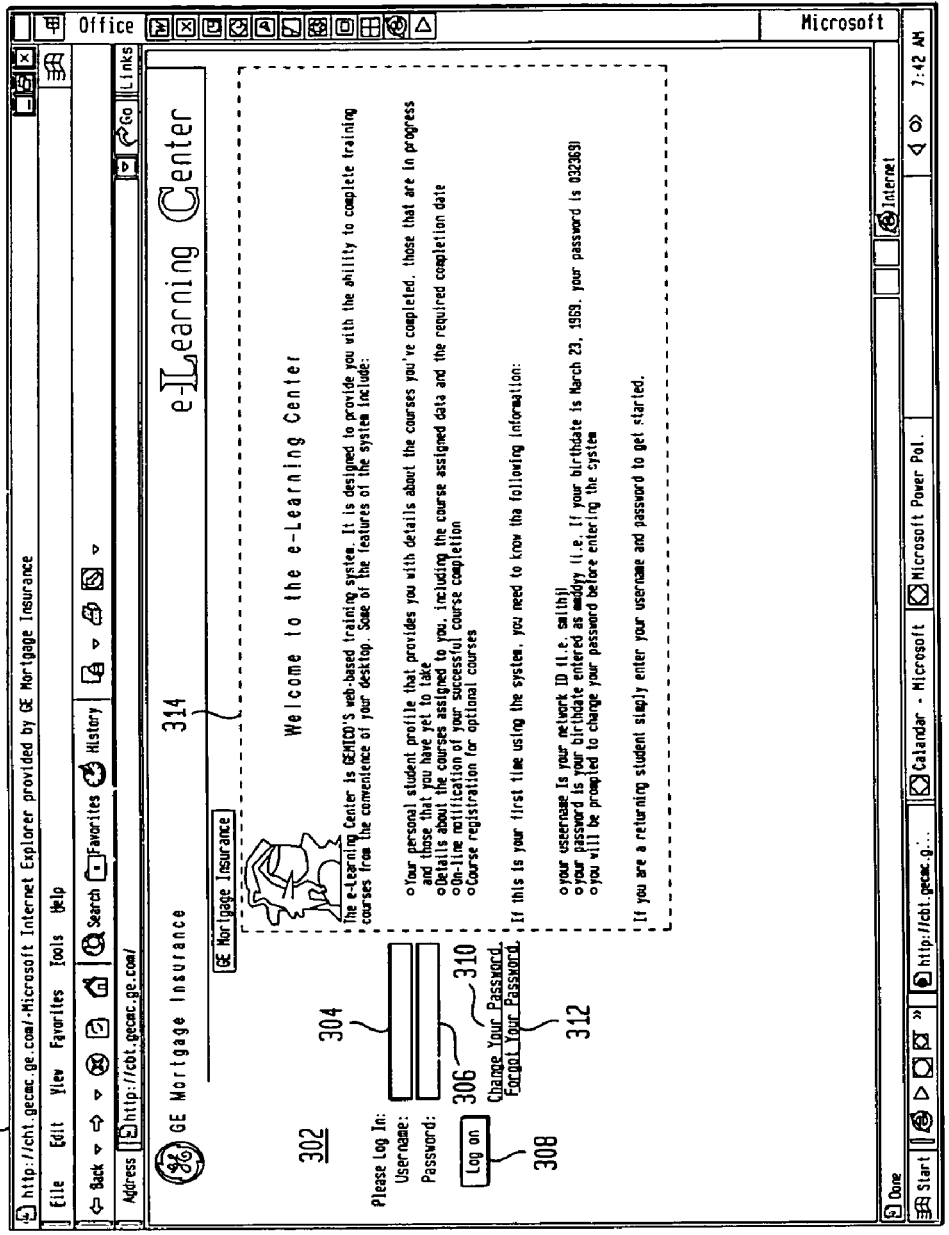
FIG. 3 illustrates a hypertext page providing a login interface to the training administration module of FIG. 2.

FIG. 3 illustrates a browser window 300 displaying a hypertext page 302 presented by the training administration module 116. The hypertext page 302 presents a security interface used to provide username and password information for login to the system 100. The hypertext page 302 includes username and password fields 304 and 306, as well as a button 308 for submission of the login information.

The page 302 also includes a first hypertext link 310 to be activated when a user wishes to change his or her password and a second hypertext link 312 to be activated when a user has forgotten his or her password. The hypertext page 302 also includes welcoming text 314, explaining some of the features of the system 100.

Figure 4:
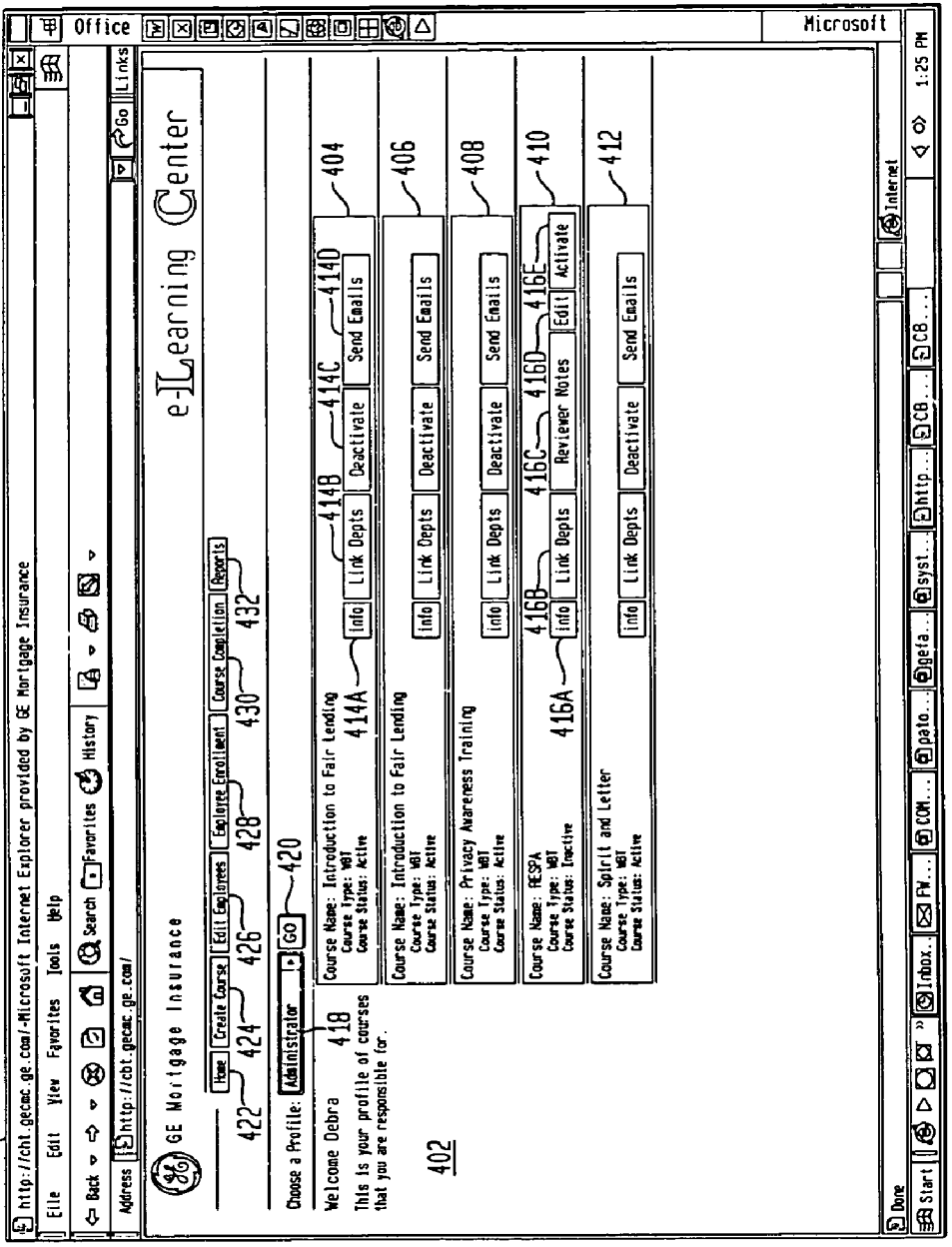
FIG. 4 illustrates an introductory hypertext page reached after logging into the training administration module of FIG. 2.

FIG. 4 illustrates the browser window 300 displaying a hypertext page 402, reached upon successful login using the page 302 of FIG. 3. The hypertext page 402 presents information appropriate to the administrator profile of a user, including course entries 404–412, each of the course entries 404–412 including a course description and commands associated with the course. The commands 414A–414D relate to the course entry 404 and the commands 416A–416E relate to the course entry 410. Commands relating to the course entries 406, 408 and 412 are similar to the commands 414A–414D and will not be discussed further herein in order to avoid repetition.

The hypertext page 402 also includes a profile selection box 418 and an activation button 420 for activating a profile selection. The hypertext page 402 also includes command buttons 422–432.

The commands 414A–414D relate to the course description 404, which describes a course which is active and available for use. Activating the Information command 414A retrieves summary information about the course. Activating the Link Departments command 414B allows the course to be linked to selected departments, that is, to automatically assign the course to users in the selected departments. This allows training to be targeted to students who are more likely to have job functions relating to the training, without a need to specifically assign training to what may be a large number of individual students. Activating the Deactivate command 414C deactivates the course, thereby rendering it unavailable for assignment or use. Activating the Send Emails command 414D sends email messages to users to whom the course is assigned, notifying them that the course is assigned to them and directing them to complete the course by a specified date, as well as an email to managers supervising the employees, notifying the managers that the course has been assigned to their employees and providing details of the assignment, for example expected start date and completion date. The Send emails command 414D also directs the system to send a reminder email to all employees who have not completed a course by a predetermined number of days before the due date. The training administration module 116 is designed such that activating the Send emails command 414D sends emails only to users who have never before received the identical email. This allows new users to be added to a course, and the Send Emails command 414D to be activated to send emails to those users, without automatically sending emails to all users who have already been assigned to the course and who have already received emails relating to the course.

The commands 416A and 416B are identical to the commands 414A–414B. The Reviewer Notes command 416C retrieves notes entered by a reviewer. The Edit command 416D invokes the course creation module 118 to retrieve the course contents and allow editing of the course contents. The Activate command 416E activates the course, making it available for assignment and use.

In addition to the commands related to specific course entries, the page 402 also includes commands not related to any specific course entry, but useful for obtaining needed information and accomplishing necessary tasks. The Home command button 422 returns the user to the hypertext page 402. As will be discussed in greater detail below, activation of commands on the page 402 may invoke different modules and cause navigation to different pages, but a command button similar to the button 422 will be present on these pages and will cause return to the page 402.

The Create Course command button 424 invokes the course creation module 118 to create a new course. The operation of the course creation module 118 is discussed in greater detail below in conjunction with the discussion of FIG. 5.

The Edit Employee command button 426 allows editing of user information for a selected user, typically a user who is assigned as a student to a course for which the administrator is responsible. Activation of the button 426 allows access to the user database 202, allowing the administrator to review student information, to correct erroneous entries and to update entries in order to keep the data current, for example by removing users who have left the company or changing the departmental association for user who have transferred to a different department.

The Employee Enrollment button 428 allows the administrator to enroll individual students or to remove them from enrollment. Typically, students are assigned to courses by department, job function, or other group, but circumstances may exist in which students need to be individually assigned to or removed from courses, for example if a student joins a department after a course has been linked to the department. In addition, the Employee Enrollment button 428 is useful for removing an employee from a course when that employee's department has been added to a course. For example, a sales department may be added to a course, and then the Employee Enrollment button 428 may be used to remove the sales department secretary from the course, because the secretary does not need to take the course.

Pressing the Employee Enrollment button 428 allows the administrator access to the user database 202 for the purpose of changing the status of a student with respect to one or more of the courses for which the administrator has responsibility. The administrator is presented with a listing of students, identifying those students who are enrolled in a course, and students who are not enrolled but are available to be enrolled. The administrator may then select a student from the list and change his or her enrollment status with respect to the desired course.

The Course Completion button 430 allows the administrator to mark a user as having completed a particular course, altering the user information to show the course as overridden, whether or not the user has actually completed the course. This function allows the administrator to exempt students from courses when they have met the training requirements in some other way.

The Reports button 432 causes the course administration module 116 to retrieve and present relevant information relating to the courses for which the administrator is responsible. This information may suitably include the status of each course, for example, whether it is active or inactive. The information may also suitably include lists of students or groupings of students assigned to a course, deadlines for completion of the course for each student or grouping of students, information relating to whether or not students are making satisfactory progress in each course, for example information about what percentage of students complete the course late or fail to pass any associated exams on the first, second or third attempt. Pressing the Reports button 432 preferably retrieves a summary list of all courses, with links to desired categories of information, with activation of a link causing retrieval of relevant information from the user database 202 and the course library 204 and processing and formatting of this information.

Figure 5:
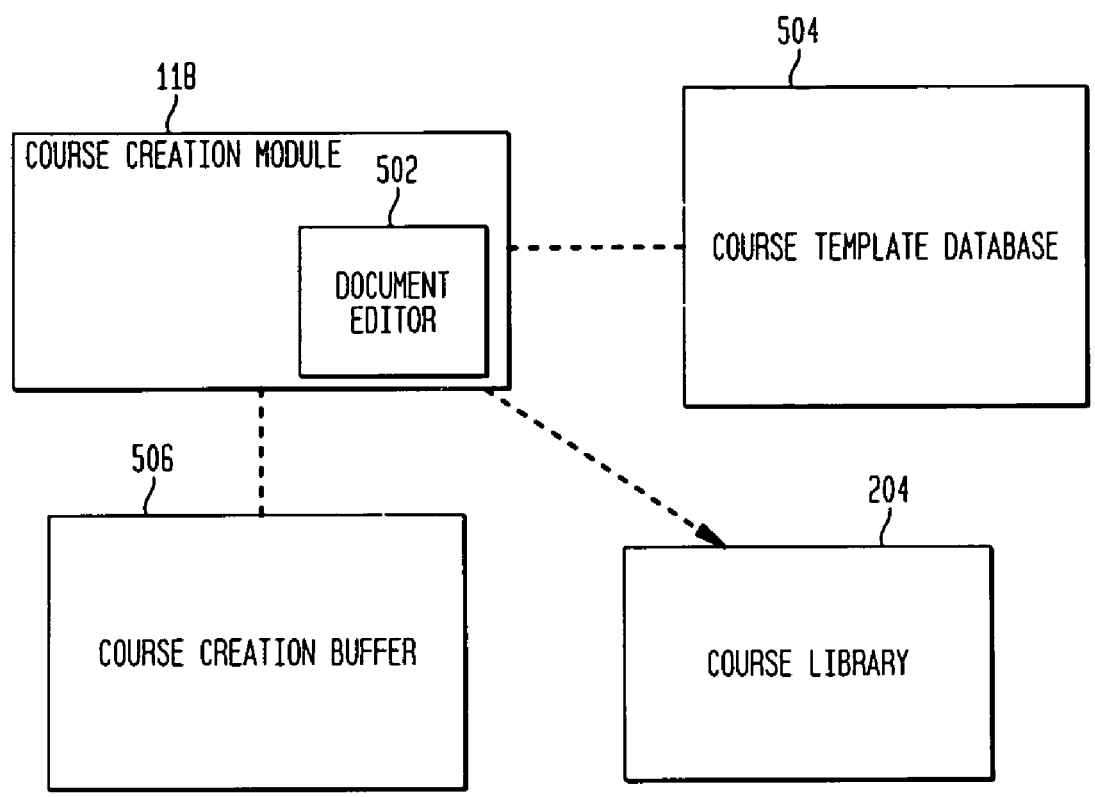
FIG. 5 illustrates a course creation module according to an aspect of the present invention.

FIG. 5 illustrates additional details of the course creation module 118 of FIG. 1. The course creation module 118 allows an authorized user, such as an administrator, to create a course, suitably in the form of a sequence of hypertext pages. The course creation module 118 includes a document editor 502 having access to a course template database 504 including a set of preformatted templates, as well as a course content database 505, including elements which may be retrieved for incorporation into a course. Elements in the course content database 505 may include text, graphics, audio or video samples, predesigned software, for example a training course purchased from a vendor, or any other content deemed suitable for storing in the database 505 for inclusion in courses.

The course creation module 118 may suitably be invoked from the training administration module 116 by a user having appropriate privileges, such as administrator or training manager privileges, and using the correct profile, such as the user's administrator or training manager profile. For example, the course creation module 118 may be invoked when an administrator activates a Create Course command, such as the Create Course command button 424 of FIG. 4. When invoked, the course creation module 118 presents an interface allowing the user to enter initial course data, including the name of the course and a description, the name of the administrator of the course, the name of the reviewer for the course, the type of training provided by the course and the number of chapters in the course, as well as a required passing score for any examination included in the course.

Once the initial data has been entered, the administrator proceeds to the next operation, for example, by pressing a next button, and the course creation module 118 stores the collected data in a course creation buffer 506 and presents a new interface, displaying the data previously entered as well as an outline or framework of the course. The interface may suitably display headings for an initial set of chapters and sections, along with a mechanism to choose editing of the chapters or sections already present and the addition of new chapters or sections.

The course creation module 118 provides the administrator with a way to create and edit documents, for example hypertext pages or collections of hypertext pages, comprising the course. The course creation module 118 allows the administrator to add, remove or edit chapters or sections and to add documents to or remove documents from a chapter or section by making appropriate commands. The course creation module 118 further allows the administrator to organize the order of the components of the course, for example to reorder chapters or sections or to establish or change the order of documents within a section.

Upon an administrator command to add a document, the course creation module 118 invokes the document editor 502. The document editor 502 retrieves a selection of templates from the course template database 504. The administrator selects an appropriate template and the document editor 502 displays the selected template. The administrator is then free to edit the template as desired in order to create a document having the desired content. The administrator can then set parameters for the document, for example by making selections within the template.

Once the administrator has selected a template and set parameters for the template, he or she then adds desired material to the template. Added material may include text, illustrations, hypertext links to documents or other useful material. In order to make the creation of documents easy for administrators who may not be familiar with programming techniques or the use of hypertext markup language (html), the template typically includes specially designed areas in which the administrator may insert material. For example, text to be added to the document can be typed or pasted into an area designed to received typed text. An illustration may be pasted into an area designed to receive an illustration. The template may also include areas designed to receive links to other material. For example, the template may provide an area into which a user may type or otherwise insert a pathname or hypertext link to a reference document or to training software purchased from a vendor. Once the desired material has been added to the template, the administrator then chooses to process the creation of the document. The text, illustrations or other material are formatted and placed in appropriate locations in the document and the document is stored in the course creation buffer 506.

Once the administrator has created all the documents which include instructional material, he or she then preferably uses a document manager 508 to review the documents and reorder them as desired. The administrator may then create and add sets of review questions, for example by creating a review question document for the end of each section. The student's answers to review questions are not stored or graded, but are intended to reinforce learning in order to prepare for any examinations included in the course. The review question document may suitably be created in a similar way to other course documents, that is, by selecting a review question template and adding desired text where indicated. The administrator places review question documents in the desired positions, for example at the end of each section or chapter.

The administrator may then add an examination to be placed at the end of the course, selecting a suitable template for creation of the examination, adding questions and alternative answers, indicating the correct answer for each question and indicating a passing score for the examination. The administrator then indicates how many attempts to pass the examination are to be allowed a student before additional attempts are refused. This feature allows the administrator to intervene in the instruction of a student who is having difficulty, rather than to simply allow the student to make additional possibly fruitless and frustrating attempts to pass the course.

It is not necessary to wait until the instructional materials have been prepared before creating review questions and examinations, but preparing the question materials last makes it easier for the administrator to make sure that the questions reflect the instructional material contained in the documents which have been prepared.

Once all the documents have been created and placed in the correct order, the administrator assigns a category to the course, that is, an area of instruction within which the course falls. If desired, the system 100 may be designed so that groups of students are automatically assigned a course if it falls within a designated category. For example, students whose job functions involve processing of mortgage applications may automatically be assigned all courses dealing with fair lending regulations. The course name, course content, course category, passing examination score, number of allowed examination attempts, administrator name and reviewer name are stored in the course library 204.

Figure 6:
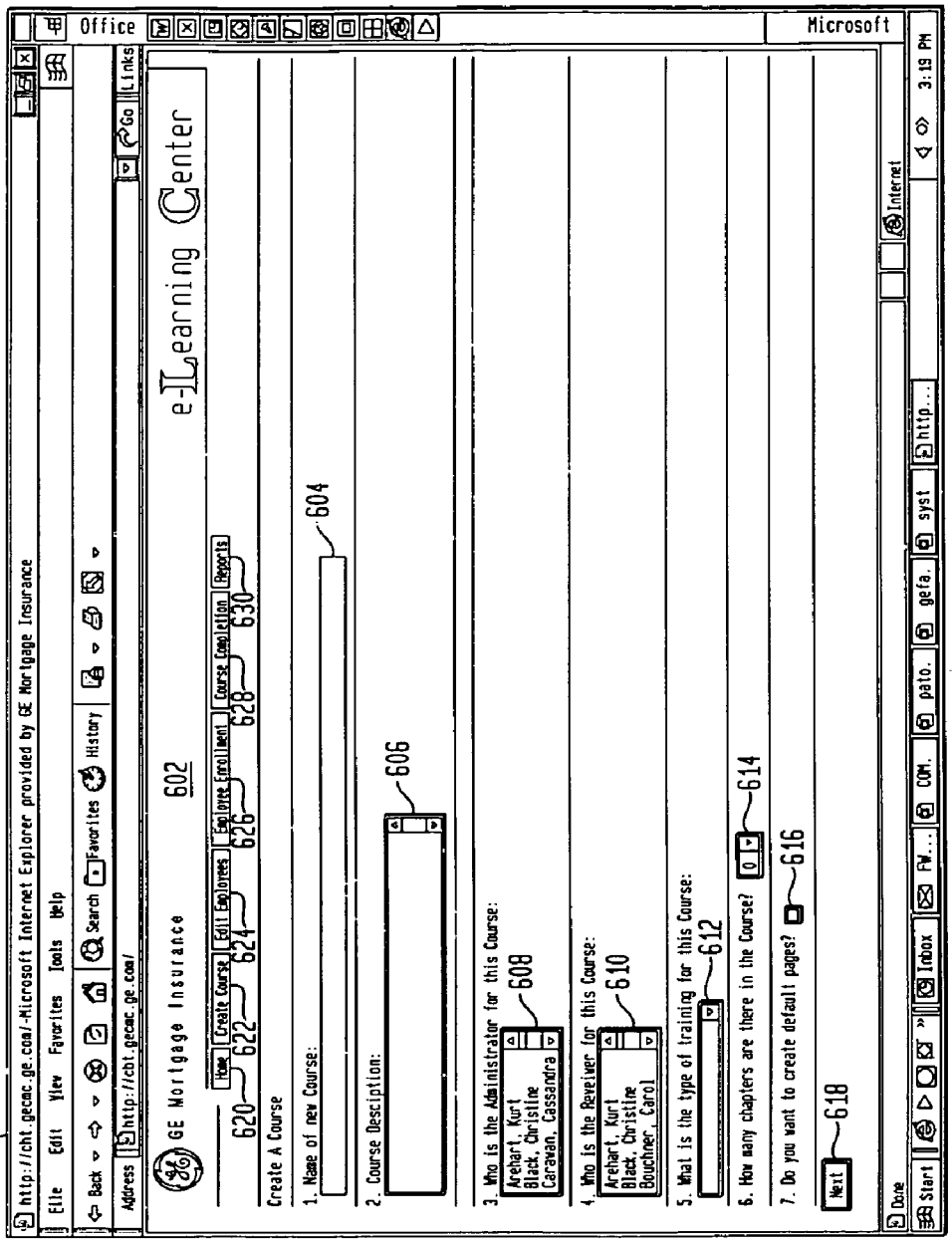
FIG. 6 illustrates a hypertext page presenting an introductory interface to the course creation module of FIG. 5.

FIG. 6 illustrates the hypertext browser 300 displaying a hypertext page 602. The course creation module 118 presents the page 602 as an introductory interface when the course creation module 118 is first invoked. The page 602 includes fields 604 and 606 for entry of the course name and course description, respectively, as well as selection boxes 608–614, allowing the administrator to make a selection from a list or other mechanism for choosing from among alternatives. The page 602 also includes a default page check box 616, which the administrator may check or uncheck in order to select or deselect the option to use default pages. The page 602 also includes a Next command button 618, which the user may activate in order to submit the entered information and proceed to the next page. The page 602 also includes command buttons 620-630, similar in function to the buttons 422–432 of FIG. 4.

Figure 7:
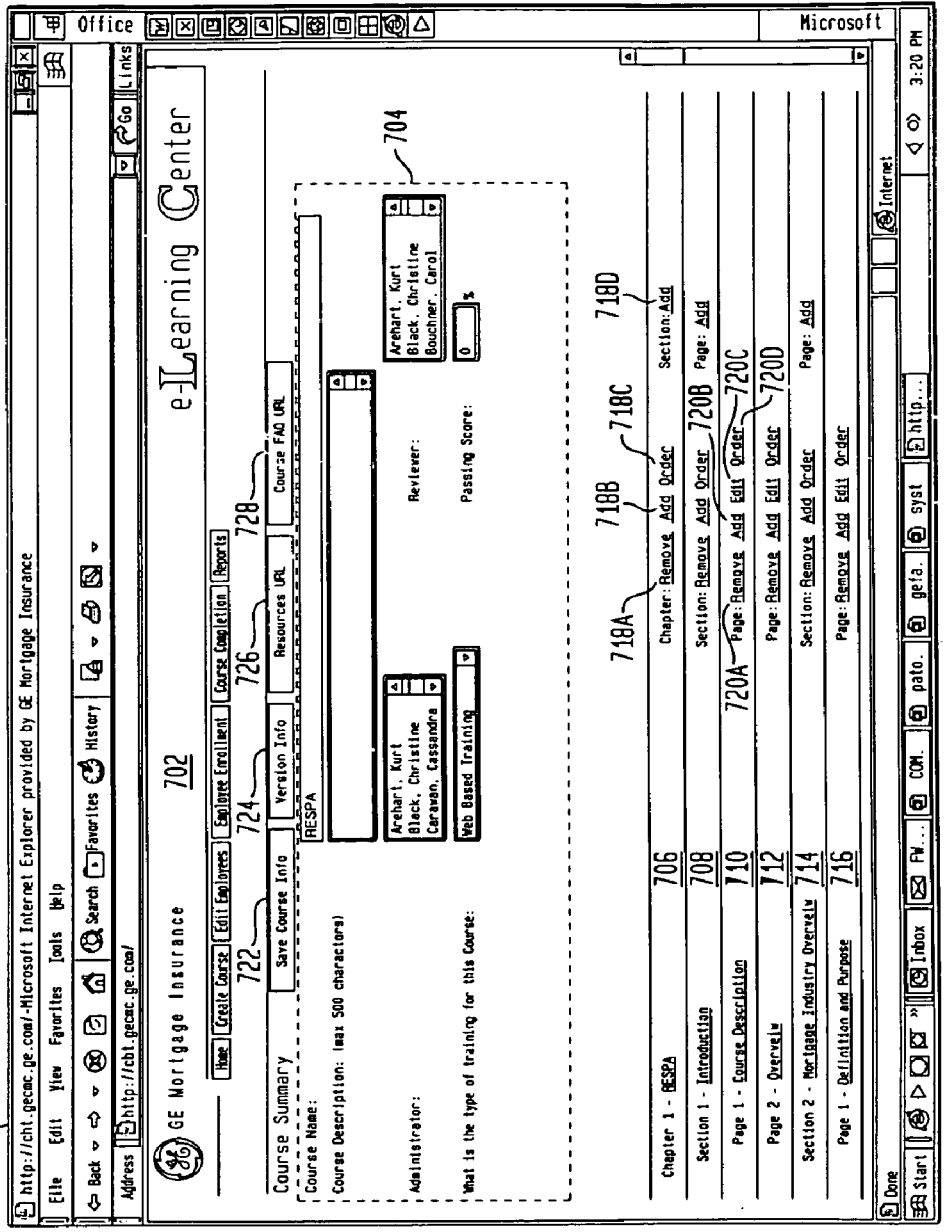
FIG. 7 illustrates a hypertext page presenting summary information for a course being created using the course creation module of FIG. 5.

FIG. 7 illustrates the hypertext browser window 300 displaying a hypertext page 702 displayed after activation of the Next command button 618 of FIG. 6, causing submission of the initial course information. The page 702 displays summary information 704 for the course, as well as an initial set of chapter, section and page headings, as well as commands relevant to those headings. The headings are preferably presented in the form of hypertext links, so that activation of an appropriate link will retrieve information associated with the link or will cause the execution of a command associated with the link.

The chapter and section headings are the heading 706, for chapter 1; heading 708 for section 1 of chapter 1; heading 710 for page 1 of chapter 1; heading 710 for section 1, page 2 of chapter 1; heading 712 for section 1, heading 714 for section 2 of chapter 1; and heading 716 for page 1 of chapter 1, section 2. Commands 718A–718D are associated with the heading 706, and allow for removal of the chapter, addition of a new chapter, ordering of the chapter with respect to other chapters and addition of a new section, respectively. Activation of the Remove command 718A removes the chapter from the course creation buffer 506, and removes the chapter heading 706 and associated commands. Activation of the Add command 718B presents a dialog box in which the user may enter a chapter name. Upon submission of the chapter name, for example by pressing an OK button in the dialog box, a new chapter, empty except for the name, is placed in the course creation buffer 508 and a new chapter heading is placed on the page 702. Activation of the Order command 718C opens a dialog box displaying chapter headings and allowing the user to move chapters up or down with respect to one another. When the administrator is satisfied with the order, he or she presses an OK button and the order is adjusted in the course creation buffer 508 and on the page 702.

Activation of the Add Section command 718D presents a dialog box in which the user may enter a section name. Upon submission of the section name, for example by pressing an OK button in the dialog box, a new chapter, empty except for the name, is placed in the course creation buffer 508 and a new section heading is placed on the page 702 as a new section of chapter 1.

The commands 720A–720D are associated with the heading 710 and are used to work with individual pages. The commands 720A and 720D are similar in operation to the commands 718A and 718C, respectively.

Figure 9:
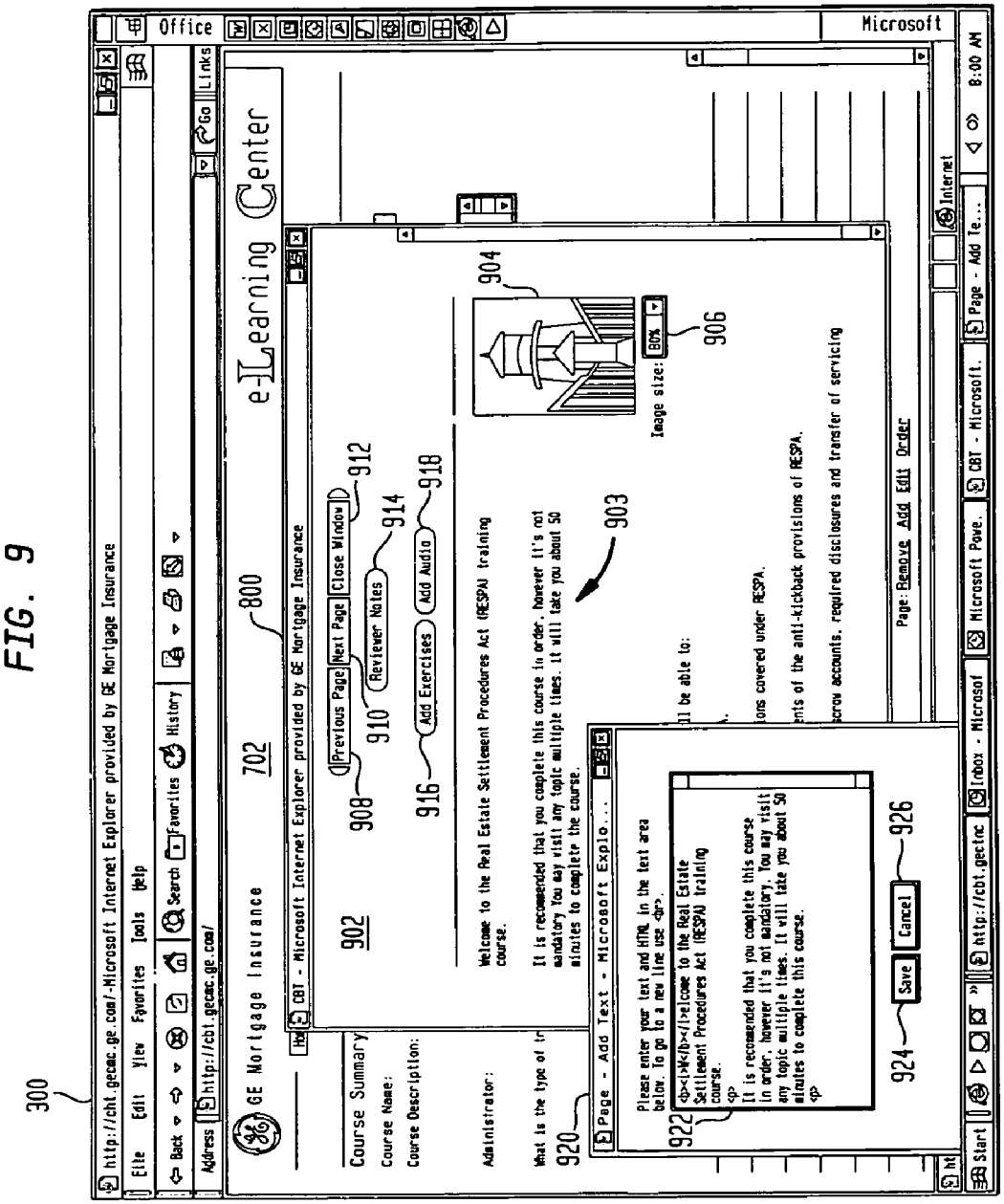
FIG. 9 illustrates a hypertext page presenting a template which has been chosen from the selection presented in FIG. 8.
Figure 10:
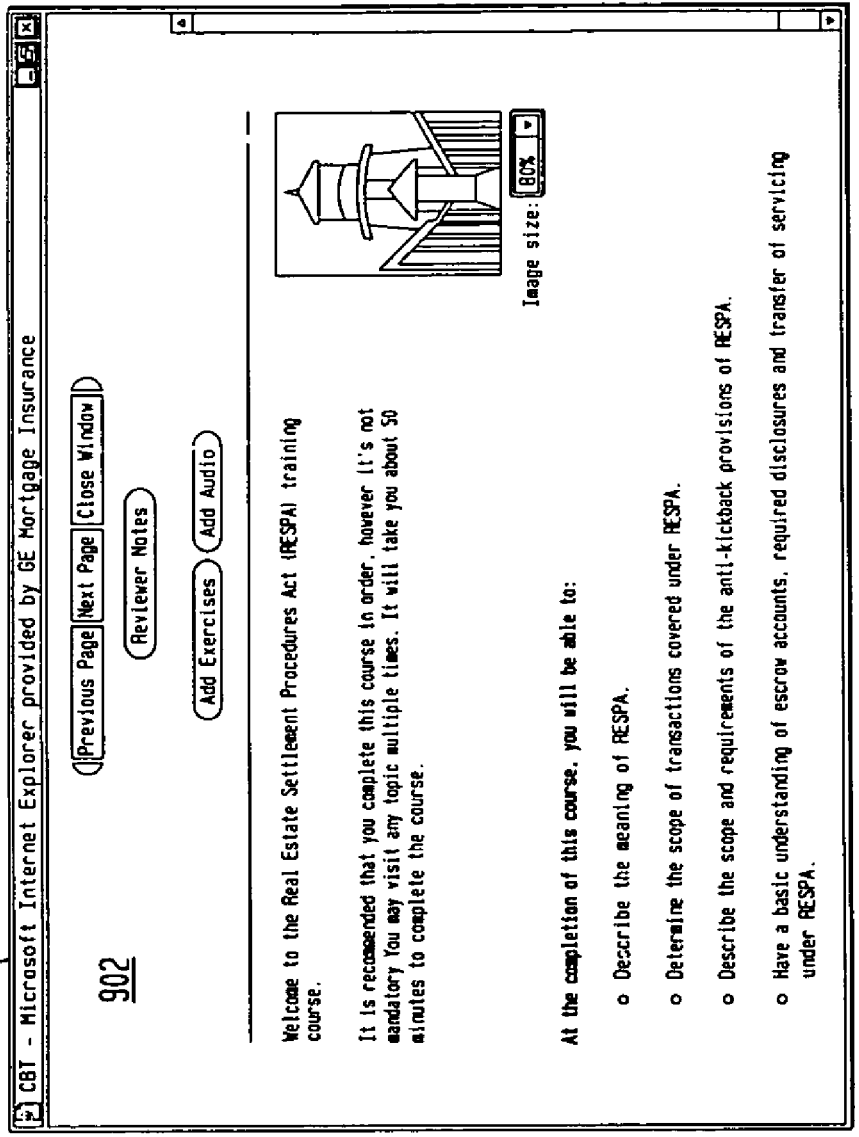
FIG. 10 illustrates a completed page which has been created and submitting using the course creation module of FIG. 5.

The Add Page command 720B invokes the document editor 504 to allow creation of a page for the course. When the command 720B is activated, a new hypertext page presenting a set of templates is presented, allowing the administrator to retrieve an appropriate template and then add content to the template to create a document. The administrator is then able to save the document thus created. Further details of creation of a page are illustrated in FIGS. 8–10 and discussed in further detail below.

The command 720C is an Edit Page command and invokes the document editor 504 in order to add material to or otherwise change the page with which the command 720C is associated.

The page 702 also includes commands 722–728. The Save Course Information command 722 saves the course in the course library 204. The administrator may continue working on the course, but activating the command 722 saves the work that has been done up until the time the command 722 is activated. The Version Information command 724 pops up a dialog box giving the version number or other version information relating to the course. The Resources URL command 726 allows insertion of a link to external resources which may be retrieved by a student taking the course. Activating the command 726 pops up a dialog box allowing entry of the link and instructions about where in the course to place the link. The Course FAQ URL command 728 allows insertion of a link to a set of questions and answers about the course or course material.

Figure 8:
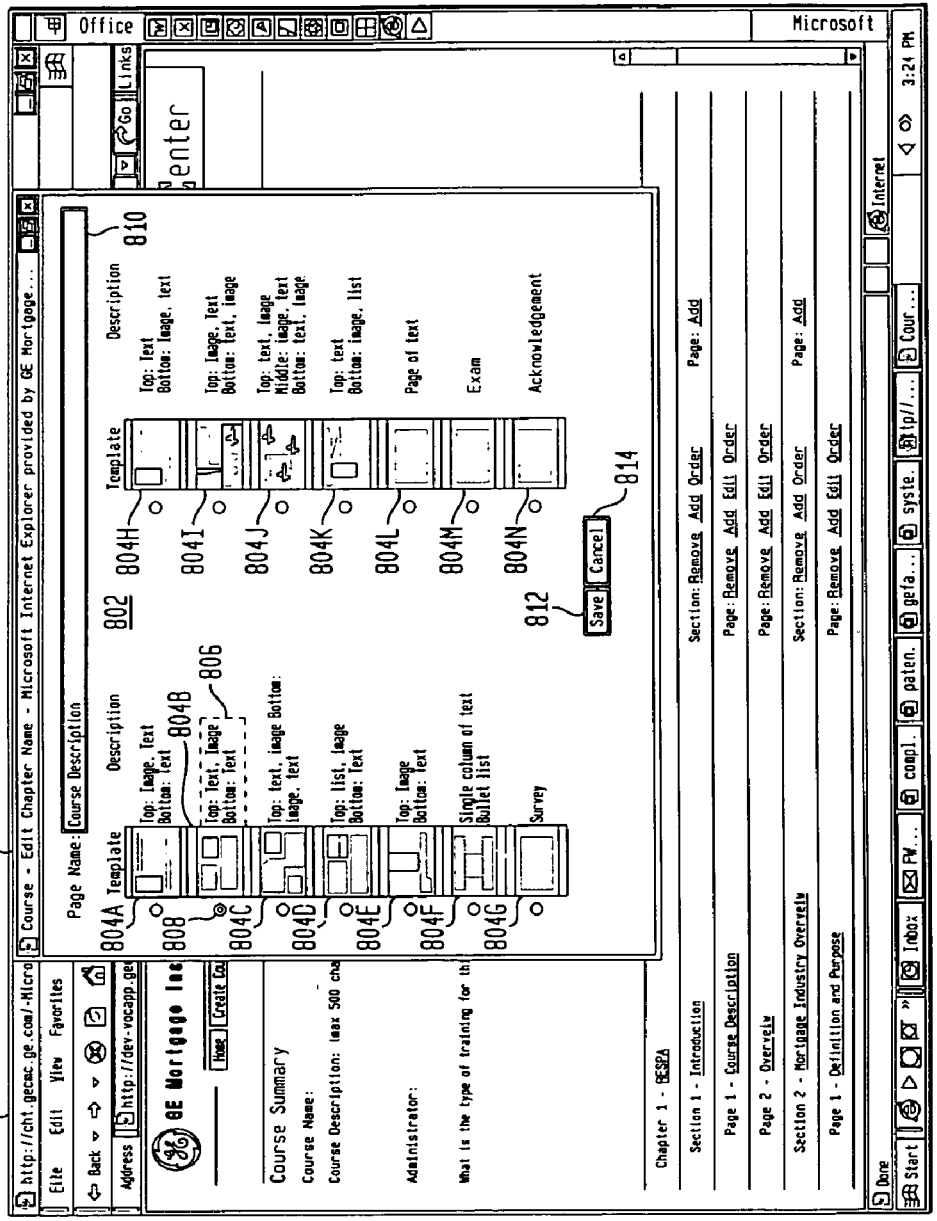
FIG. 8 illustrates a hypertext page presenting a selection of templates for use in creating a course.

FIG. 8 illustrates a new browser window 800 displaying a hypertext page 802, superimposed over the window 300 displaying the page 702. The page 802 presents a selection of templates. The templates are represented by thumbnail sketches 804A–804N, each thumbnail sketch being accompanied by explanatory text such as the text 806 accompanying the sketch 804B. Each thumbnail sketch is also accompanied by a selector such as the selector 808 accompanying the sketch 80BA. The hypertext page 802 also includes a field 810 for a name of the course page being created, and Save and Cancel buttons 812 and 814, respectively.

FIG. 9 illustrates the browser window 800 displaying a hypertext page 902, presented after selection of one of the templates presented on the page 802 of FIG. 8. The page 902 appears superimposed on the page 702. The page 902 presents a template selected from the choices presented by the page 802 and includes text 903 and an illustration 904. The page 902 is illustrated as being created, with text having been added. The page 902 includes a size selector 906, allowing the administrator to select an appropriate size for the illustration. The page 902 also includes commands 908–918 for use in editing the page 902 or navigating to other pages. In addition, a text entry box 920 is visible, created by selection of the command 720C by an administrator and used to enter text to be placed in the page 902. The text entry box 920 includes a text entry field 922, as well as Save and Cancel buttons 924 and 926, respectively. When an administrator adds text to the field 922 and presses the Save button, hypertext formatting is automatically added to the text and the page 902 is updated to include the entered text along with the hypertext formatting.

The Previous Page command 908 and the Next Page command 910 store changes made so far to the page 902 in the course creation buffer 506, and retrieve a page immediately before or after the page 902. In the case of the page 902, the next page would be page 2 of chapter 1, section 1, and there would be no previous page, so that activation of the Previous Page command 908 would have no result. The Close Window command 912 stores any additions or other editing results and closes the page 902. The Reviewer Notes command 914 retrieves notes entered by a reviewer's review of the page. The Add Exercises command 916 retrieves a template or other form allowing construction of a set of exercises related to the material in the page 902 or the page 902 and a sequence of previous pages. The Add Audio command 918 associates an audio file with the page 902, for playing when the page 902 is displayed.

FIG. 10 illustrates a browser window 1000 displaying the page 902, as presented to an administrator after the page has been saved and editing has been finished.

Figure 11:
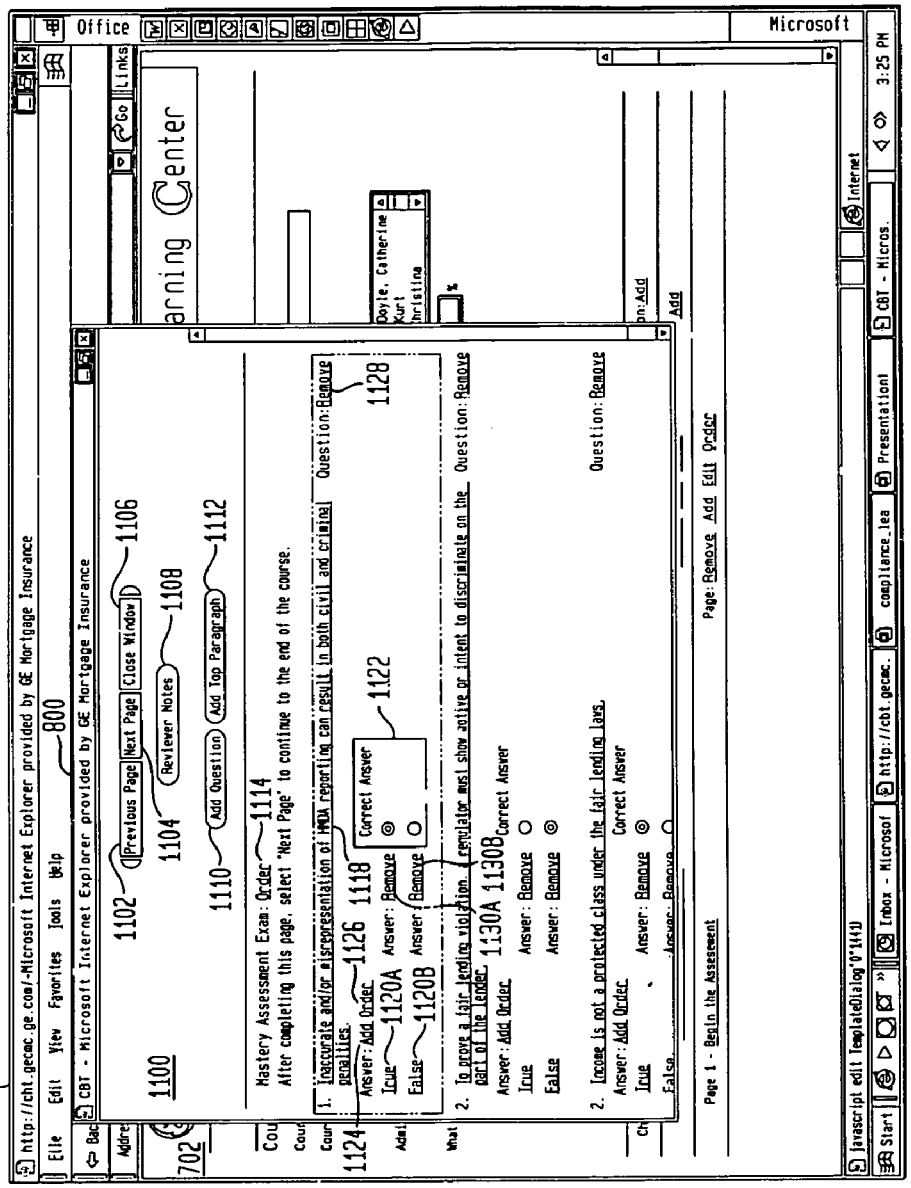
FIG. 11 illustrates a hypertext page displaying an examination which is under construction after the selection of an examination template which has been chosen from the selection presented in FIG. 8.

FIG. 11 illustrates the browser window 800 displaying a hypertext page 1100, superimposed over the window 300 displaying the page 702. The hypertext page 1100 is displayed when the administrator chooses the exam template 804M from the selections presented in FIG. 8. The page 1100 is shown here as under construction, with a number of questions already composed. The page 1100 includes Previous Page, Next Page, Close Window and Reviewer Notes commands 1102–1108, respectively, equivalent to the commands 908–914 previously discussed. The page 1100 also includes an Add Question command 1110, an Add Top Paragraph command 1112 and an Order command 1114 for ordering questions which have been created. Activation of the Add Top Paragraph command 1112 causes presentation of a text entry box similar to the text entry box 920 of FIG. 9. Once the administrator has entered desired material, preferably introductory material or instructions, in the text entry box and submitted the material, the entered material is formatted and presented in the page 1100.

When the administrator activates the Add Question command 1110, he or she is presented with a question entry box and two answer entry boxes. The question and answer entry boxes are similar to the box 920 of FIG. 9. The administrator enters the text of a question in the question entry box and the text of a possible answer in the answer entry box. The user then submits the entries. Once the entries have been submitted, the material entered into the boxes is formatted into the form of a question and accompanying answer choices, and presented as a question entry in the page 1110. For example, the question entry 1116 includes question text 1118, first answer text 1120A and second answer text 1040B. The question entry 1036 also includes an answer selector 1122. In addition, the question entry includes Add Answer and Order Answer commands 1124 and 1126, respectively. Activation of the Add Answer command causes presentation of an additional answer text box, and submission of the answer text causes the presentation of an additional answer choice and appropriate expansion of the answer selector 1122. Activation of the Order Answer command 1126 reorders the answer choices.

The question entry 1116 also includes a Remove Question command 1128 for removal of the question, as well as first and second Remove Answer commands 1130A and 1130B, for each of the first and second answer choices, respectively. Each added answer choice will be accompanied by a Remove Answer command.

A user may activate the Add Question command 1110 as many times as desired. Upon activating the command 1110, he or she may follow the procedure described above to create new question entries.

Figure 12:
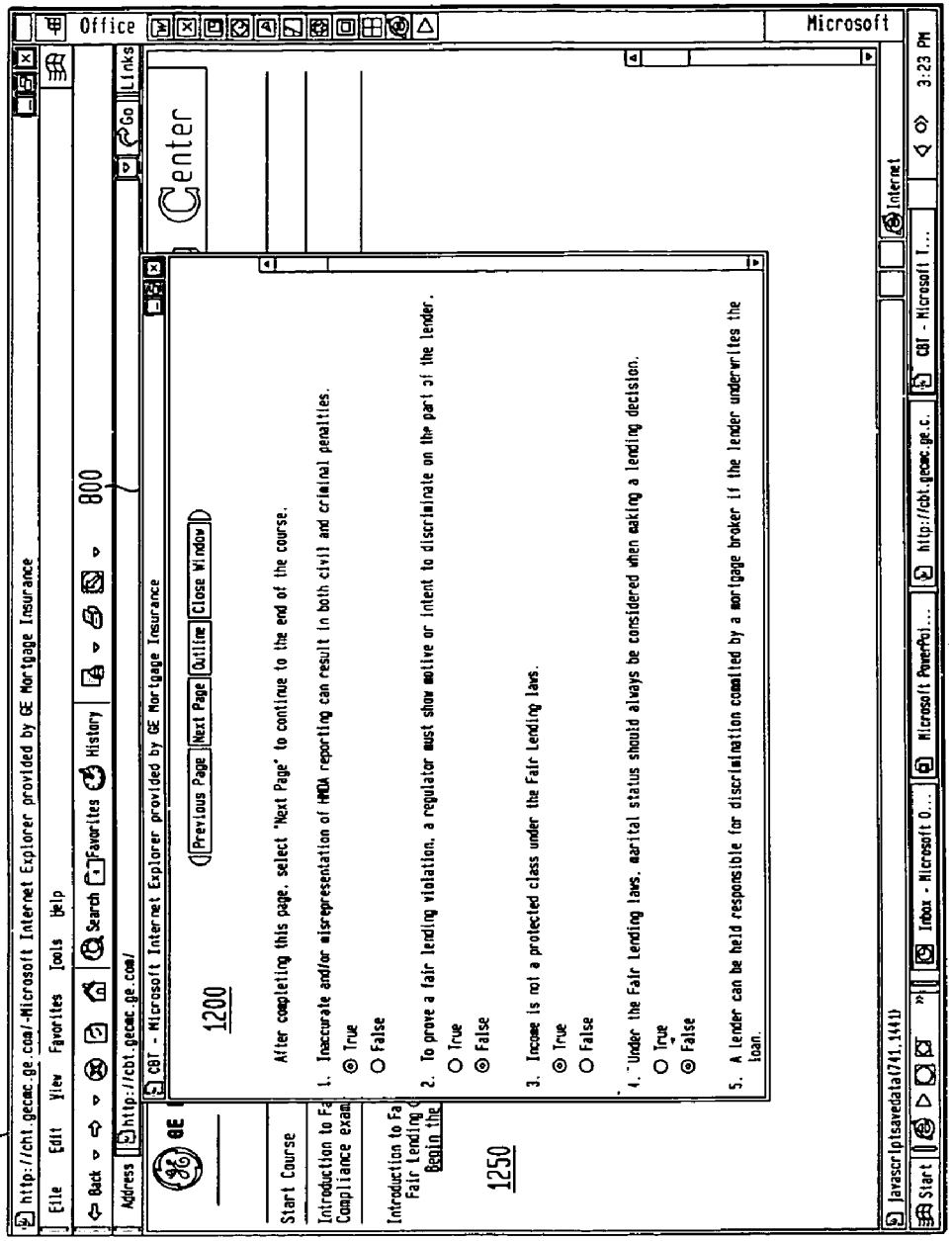
FIG. 12 illustrates a completed examination page which has been created and submitted using the course creation module of FIG. 5.

FIG. 12 illustrates the browser window 800, presenting a hypertext page 1200. The hypertext page 1200 includes the material in the page 1100, after it has been completed and stored, and as it would appear to a student taking the examination presented by the page 1200. The browser window 800 is shown here as superimposed over the browser window 300, which displays a hypertext page 1250 presented to a student taking the course of which the exam appearing in the page 1200 is a part. The page 1200 is presented upon activation of a command, preferably a hypertext link, included in the page 1250.

Figure 13:
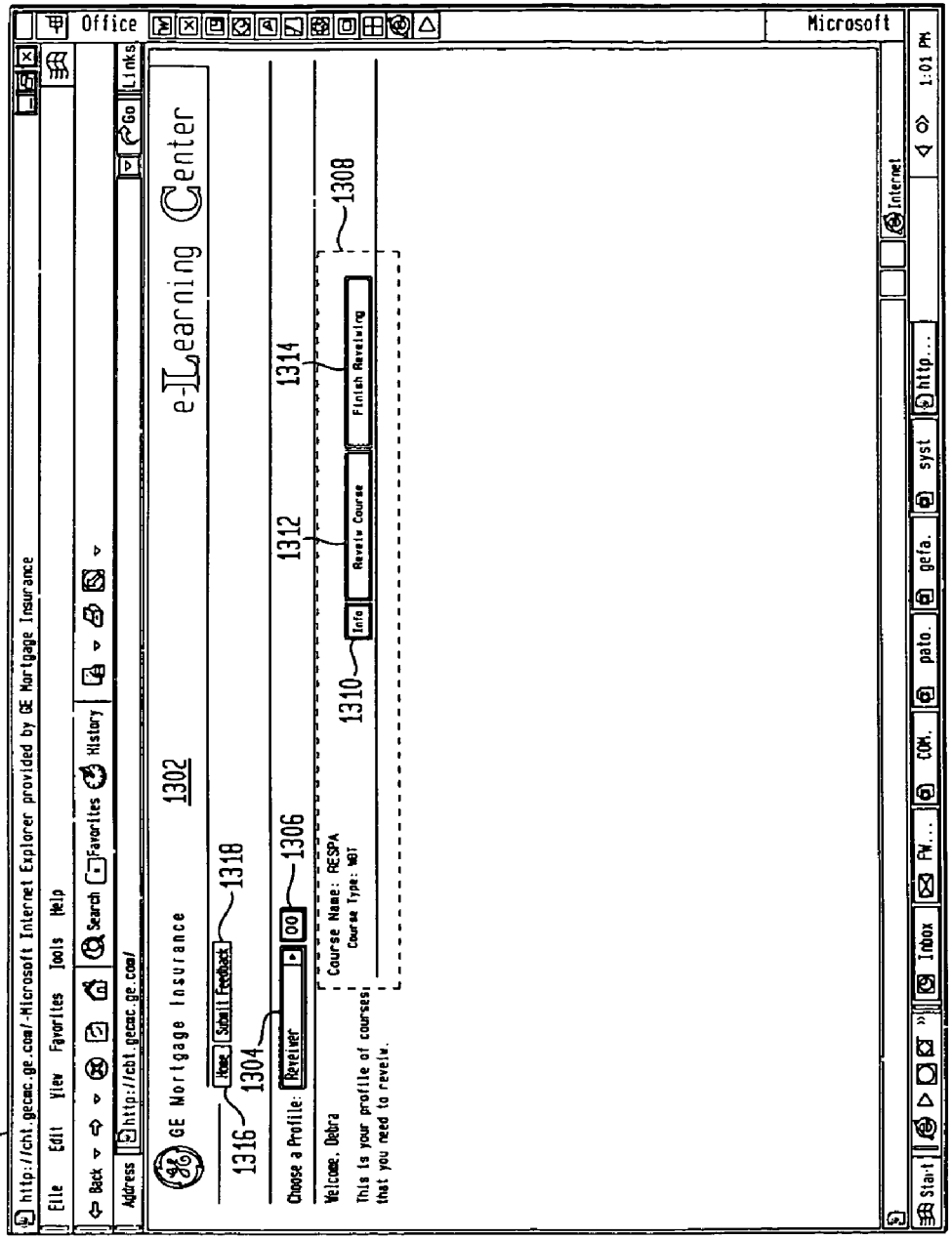
FIG. 13 illustrates a hypertext page presented to a user having responsibility for reviewing a course.

FIG. 13 illustrates the hypertext browser window 300 displaying a hypertext page 1302, containing information presented when an exemplary user has selected her reviewer profile using the training administration module 116. The page 1302 presents a profile selector 1304, as well as a Go command 1306. The page 1302 additionally presents a course entry 1308 including descriptive text, an Information command 1310 for retrieving further information about the course, a Review command 1312, for starting the course review process and a Finish Reviewing command 1314, for concluding review of the course. The page 1302 also presents the Home command 1316, for returning to the reviewer's initial profile selection page and the Submit Feedback command 1318, for submitting feedback not related to any specific course, typically feedback related to any errors or problems related to the operation of the system 100.

Figure 14:
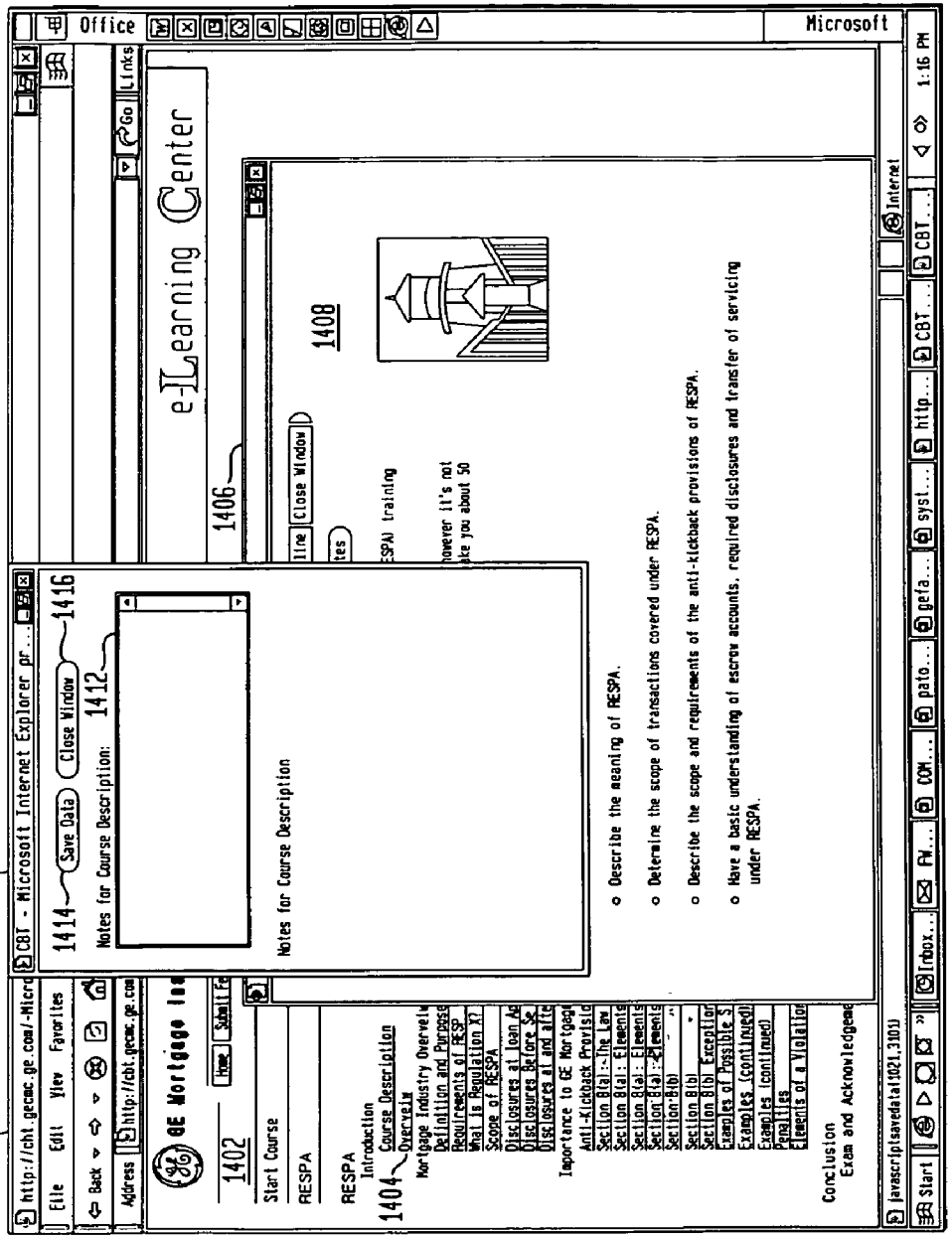
FIG. 14 illustrates a hypertext page allowing a reviewer to add and submit review notes for a course under review.

FIG. 14 illustrates the browser window 300 displaying a hypertext page 1402, resulting from a reviewer's activation of the command 1312 to review the course described by the course entry 1308. The hypertext page 1402 includes headings for various elements of the course under review, such as the heading 1404. Also visible is a browser window 1406 displaying a hypertext page 1408, resulting from a reviewer activation of the heading 1404.

Also visible is a text entry box 1410, resulting from a selection to add review notes to the page 1408. The text entry box 1410 includes a text entry field 1412 for entering text, such as notes or comments, about the page being reviewed, as well as a Save data command 1414 and a Close Window command 1416. Activating the Save Data command 1414 associates the text entered in the field 1412 with the page 1408 and saves the text in the course library 204. Activating the Close Window command closes the text entry box 1410.

Figure 15:
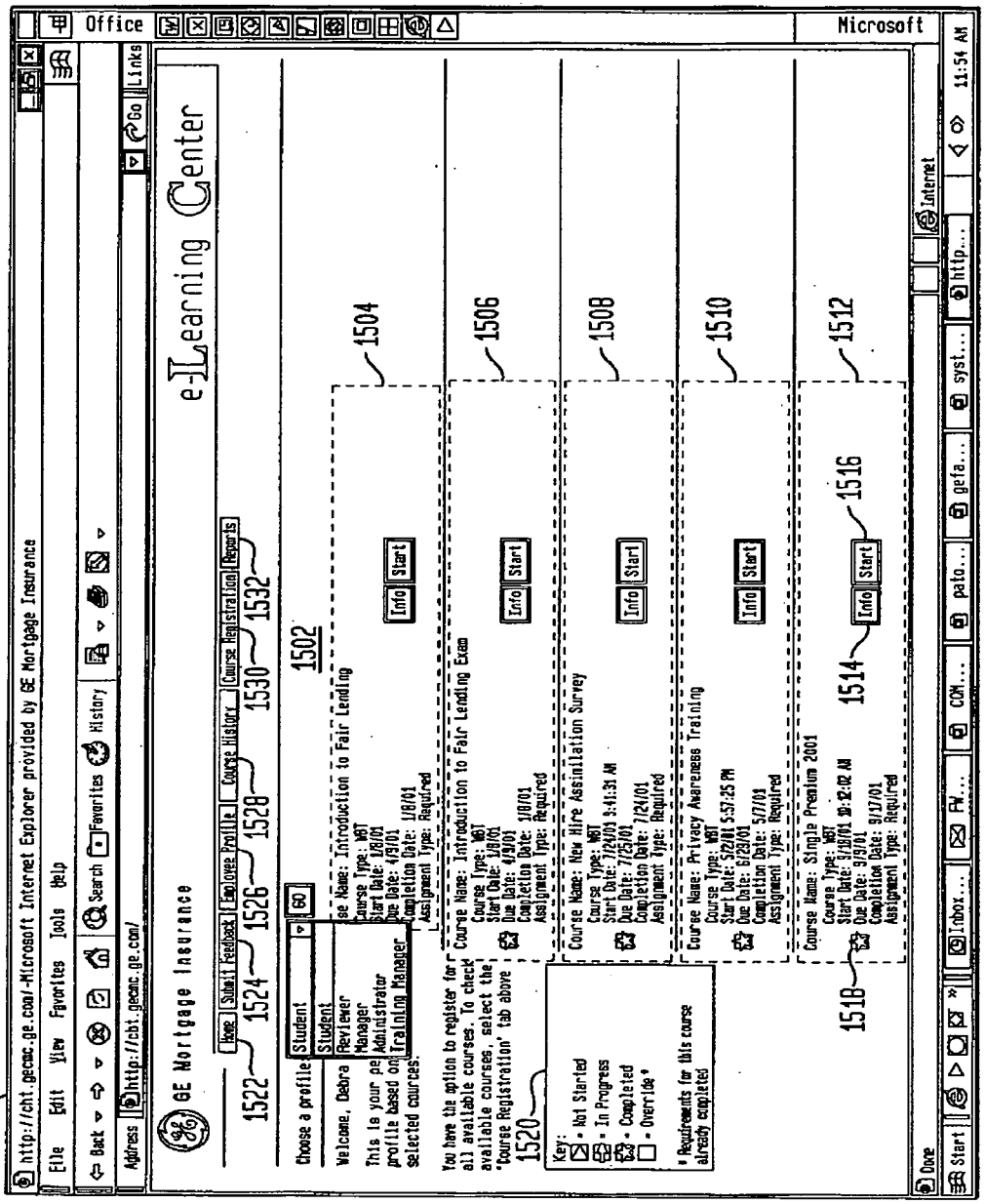
FIG. 15 illustrates a hypertext page presented to a student and showing details of courses assigned to the student or for which the student may be eligible to register.

FIG. 15 illustrates the browser window 300, displaying an initial hypertext page 1502, presented upon selection of a particular user's student profile. The page 1502 includes course entries 1504-1512. Each of the course entries includes descriptive text, accompanying commands and a status indicator. For example, the course entry 1512 includes the Information command button 1514, the Start button 1516 and the status indicator 1518. The status indicator 1518 shows the status of the student with respect to the course associated with the entry 1512, in this case, that the student has completed the course associated with the course entry 1512. The meaning of each status indicator is shown by the key 1520.

When the student presses the Start button 1516, the training administration module 116 retrieves the course from the course library 204 and displays either the first page of the course, the last page visited by the student, or a page previously bookmarked by the student, depending on the student's previous activity, if any. The student follows links and executes commands within the course pages in order to continue or complete the course. As the student performs course functions, for example viewing pages, performing exercises or taking exams, the results of selected functions, for example the taking of an exam and the score achieved, are stored in the user database 202.

Preferably, the training administration module 116 monitors the student's activities to insure that the student has actually performed all the activities designated as required for the completion of a course. For example, when a student elects to take a final examination for the course, the training administration module 116 may suitably examine the log of the student's activities and refuse to allow the student to take the examination if the student has not actually viewed every page of the course.

The page also includes the commands 1522–1532, which are not related to any specific course. The Home command 1522 is always visible to the student and its activation returns the student to the screen 1502. The Submit Feedback command 1524 opens a dialog box allowing the student to submit comments to the training administrator. The Course History command 1526 retrieves course history information relating to the student from the user database and displays this information for the student. Course history information may suitably include the actual or required start date of a course, the actual or required completion date of a course and the results of exercises or exams, for example whether an exercise was completed, whether the student passed or failed an exam and the score of an exam or exams. The course history is preferably organized by courses, with information for each course being presented in summary along with links to more detailed information.

The Course Registration command 1530 displays all courses for which a student is eligible to register. Typically, a student is automatically registered for courses to which he or she is assigned. However, a student desiring further training may review available courses to which he or she is not assigned and register for those courses. Preferably, the courses are presented in a scrollable list or similar convenient format, with courses for which a student is required to register at the top of the list. Courses for which the student is required to register immediately or within a predetermined time are preferably highlighted. Summary information is presented about each course, along with links to more detailed information. A command to register for each course is also presented. When a student selects to register for a course, course information, such as a course identification, is stored in the student's profile in the user database 202, as well as the date of registration. A required completion date, if any, is also stored.

The Reports command 1532 retrieves selected information related to the user's status in course for which he or she is eligible or registered, and presents a report displaying the information.

Individual administrators who have created courses using the course creation module 118 are able to use the training administration module 116 in order to assign a course to students and to establish criteria to be met for completing the course. The course administrator may assign a time period within which the course is to be started after being assigned, may assign a time period within which the course is to be completed after being assigned and may set a passing score for any examinations included in the course.

Figure 16:
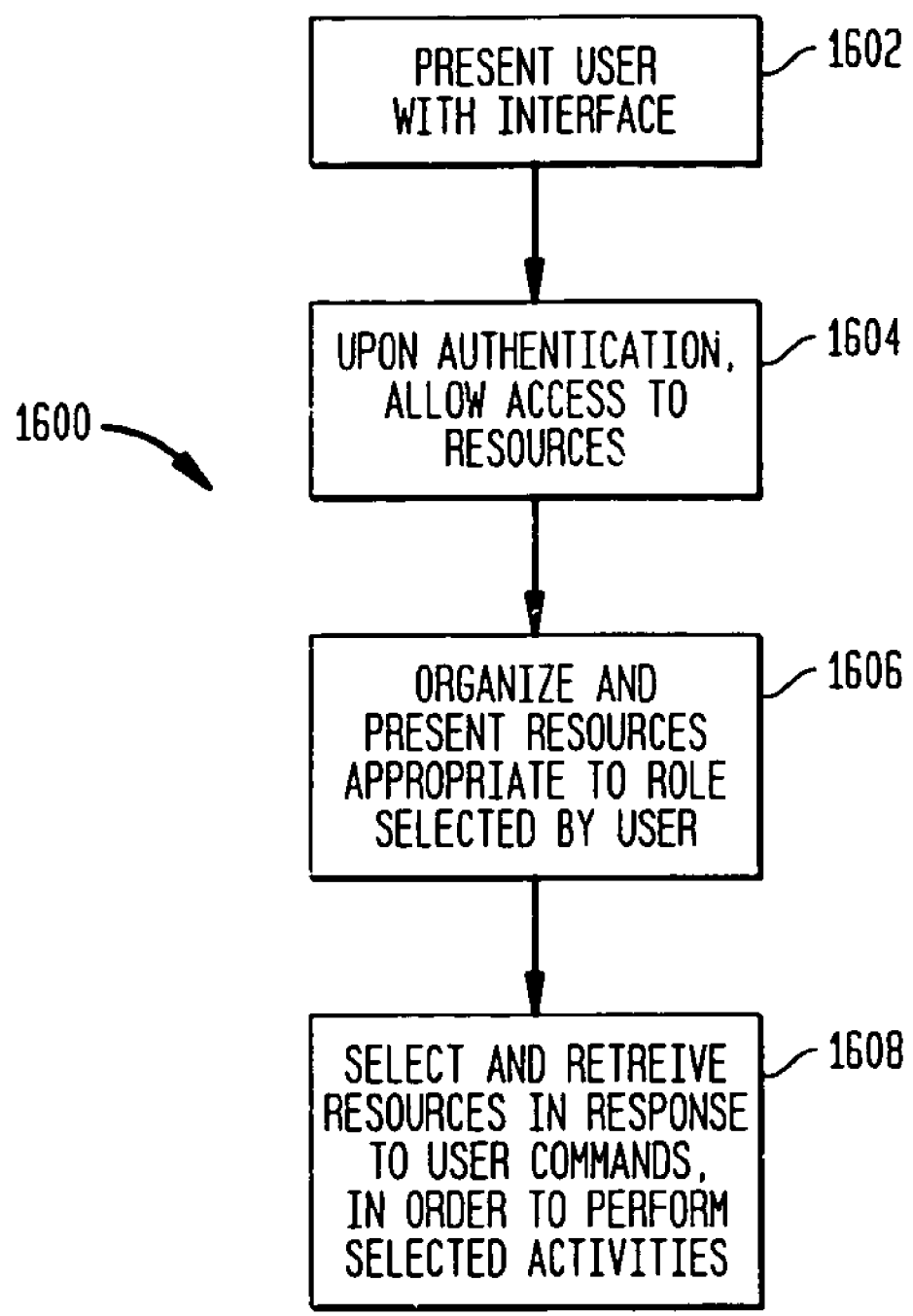
FIG. 16 illustrates a process of training management according to an aspect of the present invention.

FIG. 16 illustrates the steps of a process 1600 for preparing, managing and administering training courses according to an aspect of the present invention. At step 1602, a user is presented with an identification interface for authenticating the user in order to allow or refuse access to a collection of resources for creation and management of training courses and to establish parameters for the user's access to the resources. At step 1604, upon submission and authentication of login information, an authorized user is given access to some or all of the collection of resources. Depending on the privileges assigned to the user, the resources may include student information, course information, information about the relationships between students and training courses and resources for creation of training courses. The resources immediately available to the user may suitably be associated with a particular user function, such as course creation, course review, examination of student progress or the like. A user may suitably select a profile associated with the function the user wishes to perform, and selection by a user of a particular profile may cause the organization and presentation of resources associated with that function. For example, a single user may fulfill the roles of manager, administrator, training manager or student, as discussed above, and may select one of various user profiles in order to gain access to resources appropriate to the selected profile.

At step 1606, upon selection by a user of a profile, resources appropriate to the selected role are organized and presented. For example, if a user selects an administrator profile, an administrator page may be presented, displaying the training courses for which the administrator is responsible, with commands to assign courses to students, review student progress, edit courses, create new courses, or the like. If a user selects a manager profile, a manager page may be presented, displaying information about the students or other users for which the manager is responsible and providing access to tools for reviewing the course assignments and progress of those students. If a user selects a reviewer profile, a reviewer page may be presented, displaying courses for which the reviewer has responsibility, and providing tools for reviewing those courses. If a user selects a student profile, a student page may be presented, displaying the courses for which the student has registered or those courses which a student is required to undertake or complete, as well as tools for reviewing his or her progress. The student page may also provide a mechanism for the student to see descriptions of courses for which he or she is eligible but is not required to complete and to register for those courses.

At step 1608, in response to user commands, selected resources are retrieved and presented and information retrieved, processed and presented to the user in order to allow the user to perform desired activities. Activities which may be undertaken may include, for example, creation or editing of a course, review of a course, review or editing of the status of students with respect to a course, preparation of reports providing student status information, taking a course as a student, or any of the activities described above, as well as other activities which may advantageously be undertaken in order to administer available training courses.

FIG. 17 illustrates a process 1700 showing additional details of creating and administering training courses according to an aspect of the present invention. At step 1702, a user is presented with an identification interface for authenticating the user in order to allow or refuse access to a collection of resources for creation and management of training courses and to establish parameters for the user's access to the resources. The collection of resources may suitably be embodied in a system similar to the system 100 of FIG. 1. At step 1704, in response to entry by a user of valid authentication information, the user is presented with a selection of available profiles, each profile giving the user access to selected resources. Available profiles may suitably include student, administrator, reviewer, manager and training manager profiles and a user may be granted the ability to select one or more profiles depending on user privileges. In the present example, the user will be assumed to have training manager privileges, giving him or her access to all profiles. In this way, the process 1700 can be fully described through the example of a single user. It will be recognized, however, that other users may have access to only parts of the process 1700, depending on their privileges and the profiles available to them.

At step 1706, upon selection by the user of an administrator profile, the user (now referred to as an administrator) is presented with an administrator interface, allowing the administrator to create courses and to perform various course administration tasks, for example, to assign students to courses, to link courses to groups, such as departments or other organizations or organizational subdivisions and to obtain reports on courses and students. At step 1708, upon a command by the user to invoke a course creation module, the user is presented with a course creation interface, allowing the user to enter initial information about a course to be created. At step 1710, upon user entry of initial information about the course, a framework for the course is created and the administrator is presented with a further interface allowing him or her to add course elements to the course. The course elements may suitably be chapters, sections, documents such as hypertext pages or other pages and elements such as instructional software. Some course elements may be embedded or otherwise included in other course elements. For example, a chapter may include a number of sections, which may in turn include a number of documents or other elements. At step 1712, upon an administrator selection to add an element to the course, one or more subsequent interfaces are presented giving allowing the administrator to create and edit the element. The subsequent interfaces may include templates presenting a framework for the course element to be created, allowing the administrator to add content to the template in order to create the course element. The template preferably includes specially constructed areas to simplify the addition of content. At step 1714, upon an administrator selection to order elements in the course, course elements are ordered as directed. Ordering may suitably be an iterative process, with elements being moved forward or backward with respect to other elements, in response to commands and selections by the administrator. This movement may occur repeatedly, in response to repeated commands by the administrator. At step 1716, upon an administrator command to save a course, the course elements are assembled in the order which the administrator has chosen and stored in a course library.

At step 1718, upon an administrator command to perform an administrative activity, the selected task is performed. Tasks may include assigning courses to students. A course may be assigned to one or more organizational groups, for example departments, or may be assigned to individual students. Additional activities may include notifying students of course requirements, furnishing reports relating to student progress in a course, such as course completion, deadlines by which students must complete courses, or attempts to pass examinations included in courses. Further activities include retrieving and displaying reviewer notes relating to a course, or any of a number of other tasks which may suitably be similar to those described above in connection with the discussion of FIG. 4.

At step 1720, upon a user selection of his or her reviewer profile, the user (now referred to as a reviewer) is presented with an interface showing the courses for which the user has reviewer responsibility. At step 1722, upon selection by the reviewer of a course, the course is presented to the reviewer from the same perspective a student would have upon taking the course. That is, the reviewer is able to page through the course and to see the various pages and other elements of the course as they would appear to a student. However, each page of the course includes a command to add reviewer notes. At step 1724, upon selection by a reviewer to add reviewer notes to a course element, an interface such as a text box is presented, allowing the user to enter desired notes. The notes are then received from the user. At step 1726, upon entry by the reviewer of reviewer notes and a selection by the reviewer to save the reviewer notes for the element, the reviewer notes for the element are temporarily buffered. At step 1728, upon a reviewer command to save and submit reviewer notes, all reviewer notes entered by the reviewer for the course are stored in the course library in association with the course, in such a way that they can be retrieved by an administrator or other person having administrative responsibility for the course.

At step 1730, in response to a user selection of a manager profile, the user (now referred to as a manager) is presented with a manager interface showing a list of all students whose participation in training is supervised by the manager. At step 1732, in response to selections and commands by the manager, administrative tasks are performed relating to some or all of the listed students. The administrative tasks may include retrieving and displaying information relating to the course assignments and progress of the students, displaying student deadlines for training and sending reminders to students in order to remind them to complete training.

At step 1734, in response to a user selection of a student profile, the user (now referred to as a student) is presented with a student interface presenting a list of courses to which he or she is assigned, as well as a selection of commands including a command to review other available courses. At step 1736, in response to a student command to review and register for available courses, a list of available courses is presented along with commands for registration for selected courses. At step 1738, upon a selection by the student to register for a course, the student is designated as enrolled in the course, suitably by an entry in the student profile. At step 1740, upon a student selection of a course in which he or she is enrolled, the course is presented and an appropriate page or other element of the course is displayed. The element may be an introductory page if the student is starting the course, or may be the last page or element viewed if the student has partially completed the course. At step 1742, upon selections and commands and other entries by the student, selected course elements are retrieved and displayed as selected and inputs, such as examination answer entries are received and processed.

At step 1744, information about the student's activities, such as actions taken, examination scores or a notation that the student has passed the course, is stored in association with identifying information relating to the student, for example as part of the student profile. This information is available to a party such as an administrator or manager having responsibility for the training activities of the student, and can be retrieved by such parties as needed, for example in the form of reports described above.

While the steps of the process 1700 have been presented as occurring in sequence, it will be recognized that these steps need not all occur every time the process 1700 is performed, and need not occur in the sequence presented. Instead, the steps of the process 1700 may occur in any sequence required, based on the needs and choices of the particular user or user for whom the process 1700 is performed at a particular time.

While the present invention is disclosed in the context of aspects of an embodiment employing a specific system and exemplary web pages, it will be recognized that a wide variety of implementations may be employed by persons of ordinary skill in the art consistent with the above discussion and the claims which follow below.

What is claimed is:

1. A computerized training management system tangibly embodied on a computer-readable medium, comprising:

a course library including course information for a plurality of training courses, each training course comprising a plurality of course documents organized in a sequence for presentation to a student, the course information for each course including assignment information indicating classes of users to which the course may be assigned;

a user database including user information including a user entry for each of a plurality of users having actual or potential responsibility for one or more courses, the user database including user status information including the status of a user with respect to one or more courses;

a training administration module for associating courses, students and other users having responsibilities for courses, and for retrieving and reporting user and course information, the training administration module being operative to retrieve user information from the user database and course information from the course library and to process and format the user information and course information for display, the training administration module being further operative to modify the course information and user information to assign courses to classes of users; and a course creation module for creating courses, the course creation module including a document editor having access to a template database comprising a plurality of stored templates, the course creation module being operative to create a course comprising a plurality of course documents, the document editor being operative to create a document by retrieving a stored template and placing appropriate text, graphics and other material in the template in response to user entries, the course creation module also including a course creation buffer for temporary storage of course documents after creation by the document editor, the course creation module being operative to store course documents as they are created, the course creation module being further operative to organize the course documents into a desired sequence in response to user selections in order to form a completed course and to store the course in the course library.

2. The system of claim 1 wherein each user entry includes profile information for one or more user profiles applicable to the user and one of which may be selected by the user at any one time, each user profile including profile information specifying the information and functions available to the user when the user has selected that profile.

3. The system of claim 2 wherein the profile information includes course responsibility information applicable to the profile and the user and wherein the course responsibility information specifies all courses for which the user has responsibility and the nature of the responsibility of the user for the course.

4. The system of claim 3 wherein the user entry for each user may include one or more of;
- a student profile enabling a student to register for and take one or more available courses,
- an administrator profile giving an administrator oversight responsibility for one or more courses and allowing an administrator to create, edit or assign a course and to review the progress of students taking or assigned to courses for which the administrator has responsibility,
- a reviewer profile giving the reviewer responsibility to review one or more courses and to enter comments and suggestions which are conveyed to the administrator having responsibility for the course,
- a manager profile giving a manager oversight responsibility for one or more users and allowing the manager to assign courses to students for which the manager has responsibility and to review the progress of students for whom the manager has responsibility, and
- a training manager profile, allowing the training manager complete access to all information in the system and allowing the training manager to perform all functions available under a student profile, an administrator profile, a reviewer profile or a manager profile.

5. The system of claim 4 wherein each course comprises a sequence of hypertext pages including links to preceding and following pages in the course and wherein each course includes an introductory page outlining the course and providing links to subsequent pages in the course.

6. The system of claim 5 wherein each course is organized into a sequence of chapters and wherein each chapter is further organized into a sequence of sections.

7. The system of claim 6 wherein each chapter includes an introductory page listing the sections in the chapter with hypertext links to each section.

8. The system of claim 7 wherein each section includes an introductory page listing the pages comprising the section with hypertext links to each page.

9. The system of claim 8 wherein the course creation module receives initial course information from a user upon a selection by the user to create a course, the initial course information including a course title and numerical information indicating how many chapters are to make up the course and, upon submission of the information by the user, organizes an initial course framework based on the information, the initial course framework including a course introductory page and a number of blank chapters, the number of blank chapters being the number indicated in the initial course information, each blank chapter including a chapter introductory page and a single section, the single section including a section introductory page, the course introductory page including an outline of the course with links to each chapter and section and the chapter introductory page including an outline of the chapter with a link to the section, the course creation module being operative to add additional chapters, sections or pages to the initial course framework upon a user selection and to update the introductory page to include the added elements.

10. The system of claim 9, wherein the course creation module further comprises a course content database and wherein the document editor is operative to retrieve course elements from the course content database for incorporation into a course document.

11. The system of claim 10, wherein each user entry includes a student profile, each student profile including a student status with respect to each course for which the student is eligible.

12. The system of claim 11, wherein the training administration module is operative to edit the status of each student according to selections made by an authorized user.

13. The system of claim 12, wherein the training administration module is operative to modify the status of each student with respect to a course according to activities undertaken by the student in relation to the course.

14. The system of claim 13, wherein the training administration module is operative to retrieve course information and user information and prepare reports presenting selected course and student information.

* * * * *